Aug. 13, 1946.  O. H. YORK  2,405,725
APPARATUS FOR PRODUCING ANNULAR COMPRESSED WIRE MESH UNITS
Filed March 2, 1945
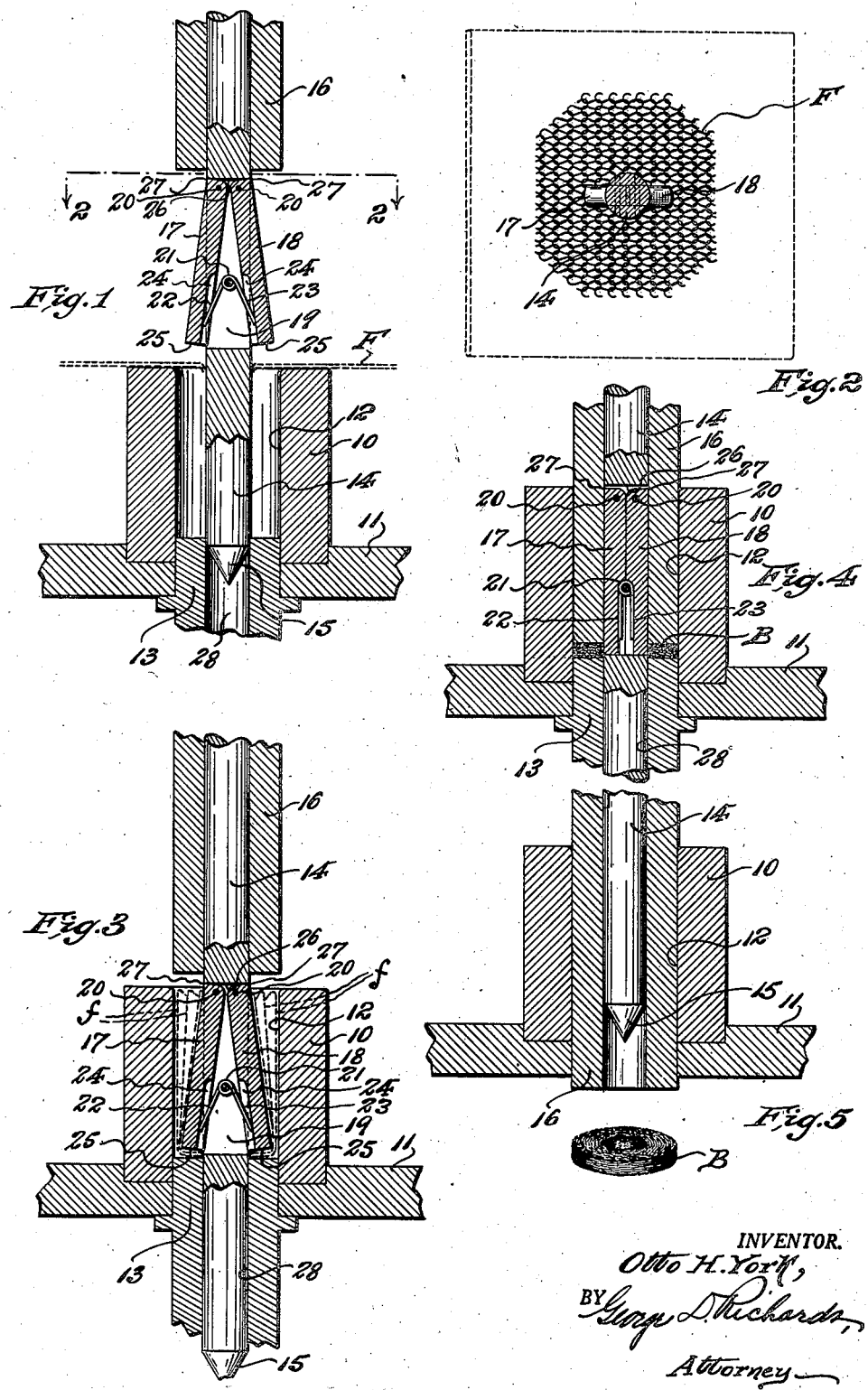
INVENTOR.
Otto H. York,
BY George D. Richards,
Attorney Patented Aug. 13, 1946

2,405,725

UNITED STATES PATENT OFFICE 2,405,725

APPARATUS FOR PRODUCING ANNULAR COMPRESSED WIRE MESH UNITS

Otto H. York, Maplewood, N. J., assignor to Metal Textile Corporation, West Orange, N. J., a corporation of Delaware Application March 2, 1945, Serial No. 580,696

8 Claims. (Cl. 140—71)

This invention relates to improvements in means for producing perforate or annular compressed wire mesh units or bodies of the general type disclosed in my copending application for United States Letters Patent Ser. No. 573,096, filed January 16, 1945.

This invention has for an object to provide improved molding apparatus for producing an annular or perforate self form sustaining unit or body of wire mesh fabric folded upon itself and compressed into a consolidated body mass, wherein the fabric folds, plies and the wires thereof are collapsed upon themselves and compacted into interentangled and interlocked relation; said apparatus comprising a mold block providing a mold cavity, a mandrel to axially enter said mold cavity, and a tubular compression plunger slidable on said mandrel and adapted to enter said mold cavity to engage and compress the wire mesh fabric material deposited therein; said mandrel including novel means operative to insert the wire mesh fabric material into the mold cavity preparatory to the application thereto of compacting pressure by said compression plunger.

The invention has for a further object to provide, in molding apparatus for the purposes stated, a mandrel having yieldably and laterally projected push finger means which, in initially projected position, is adapted to engage wire mesh fabric material so as to carry the same into the mold cavity when said mandrel is caused to enter the latter; said push finger means being adapted to be thereafter retracted by the descending compression plunger so as to be disposed flush with the external surface of the mandrel, to form therewith a continuous or uninterrupted cylindrical surface by which the internal diameter of a produced annular compressed wire mesh unit or body is determined and limited.

Other objects of this invention, not at this time more particularly enumerated, will be understood from the following detailed description of the same.

An illustrative embodiment of this invention is shown in the accompanying drawing, in which:

Fig. 1 is a vertical longitudinal sectional view of molding apparatus according to this invention, with the mandrel and its push finger means poised to engage and enter wire mesh fabric into the mold cavity; Fig. 2 is a horizontal sectional view, taken on line 2—2 in Fig. 1; Fig. 3 is a vertical longitudinal sectional view similar to that of Fig. 1, but showing the mandrel and its push finger means lowered into the mold cavity to deposit the wire mesh fabric within said cavity; Fig. 4 is a similar view, showing the compression plunger operative to retract the push finger means of the mandrel and as disposed to exert compacting pressure upon the wire mesh fabric within the mold cavity; and Fig. 5 is a similar view showing the bottom closure means of the mold cavity withdrawn, and the compression plunger advanced to eject a completed compressed wire mesh unity or body from the mold cavity.

Similar characters of reference are employed in the above described views, to indicate corresponding parts.

The molding apparatus according to this invention comprises an upwardly open mold block 10 suitably mounted on a supporting base 11 whereby to provide a mold cavity 12 of selected cross sectional shape and size. The bottom end of the mold cavity is closed by suitable closure means. In a preferred form thereof, said bottom closure means comprises a withdrawable bottom member 13 corresponding in cross sectional shape to the cross-sectional shape of the mold cavity 12, so as to be adapted to be entered in the bottom end of said cavity 12. Cooperative with said mold block and its cavity is a movable mandrel 14, the lower end of which is pointed as at 15. Said mandrel 14 is disposed in axially aligned relation to the mold block cavity 12, and is adapted to be moved downwardly thereinto through the upper open end thereof. Telescopically slidable over said mandrel 14 is a tubular compression plunger 16, the same corresponding in cross-sectional shape to that of the mold block cavity 12, in which it may be slidingly entered. Said compression plunger 16 is arranged to be moved independently of the mandrel 14.

The mandrel 14 is provided with laterally projectable and retractable push finger means, the same comprising at least one push finger member housed in an opening or slot which opens outwardly from the side of the mandrel body above its lower free end. Said push finger member is pivotally connected by its upper end to the mandrel body, and is yieldably urged to outswung projection from a side of the latter by spring means, so that its outswung lower end provides a wire mesh fabric engaging shoulder. Preferably, two or more such push finger members are provided for radial projection from the mandrel sides. When the mandrel is of comparatively small cross-section, two oppositely projectable push finger members provide a satisfactory construction, but in large size mandrels more than two such push finger members, equi-spaced around the circumference of the mandrel would be desirable. In the illustrative form and arrangement of the push finger means as shown in the accompanying drawings, the same comprises a pair of oppositely disposed push finger members 17 and 18 arranged back to back in an elongated laterally open housing slot 19 with which the mandrel body is provided. The upper end portion of each push finger member is pivotally connected to the mandrel body by a transverse pivot pin 20. Supported within the housing slot 19, intermediate said push finger members 17 and 18, is a spring member 21, the respective arms 22 and 23 of which thrustingly bear against the backs of the respective push finger members. Each push-finger member is preferably provided with a longitudinal channel or groove 24 in which said spring member and its arms may be received, when the push finger members are retracted into the housing slot 19. Said spring member yieldably urges the push finger members 17 and 18 to outswung positions, whereby their lower extremities form push shoulders 25 which jut angularly from the external sides of the mandrel body. Suitable means for limiting the outswinging movement of said push finger members is provided; for example, as shown, the upper end wall 26 of the housing slot 19 may be suitably spaced from the upper extremities of the push finger members, so that the outer edges 27 of said extremities, by abutment upon said end wall 26, will arrest outswinging movement of the push fingers. The outer faces of said push finger members 17 and 18 are of transversely arcuate contours of the same radius as that of the mandrel body, so that, when said push finger members are retracted or pushed back into the housing slot 19, their outer faces will be aligned flush with the external surfaces of the mandrel to form therewith continuous surface areas conforming to the cylindrical surface of the mandrel.

In the use of the molding apparatus, a suitable length and width of preferably knitted wire mesh fabric F is provided. The wire mesh fabric is stretched and suitably held across the upwardly open mouth of the mold block 10 below the raised mandrel 14 and compression plunger 16, whereupon the mandrel 14 is first caused to descend. In descending upon the wire mesh fabric F, the pointed end 15 of the mandrel is caused to pierce said fabric so that the mandrel descends therethrough until the push shoulders 25 of the outswung push finger members 17 and 18 abut said fabric, whereupon the latter is released. Thereafter, as the mandrel continues to descend the push finger member engaged fabric F will be carried along therewith into the mold cavity 12. As the fabric F is thus moved into the mold cavity, those portions of the fabric body extending from the mandrel are, by engagement with the side walls of said mold cavity and between the same and said mandrel, not only upturned about the mandrel, but are at the same time formed into a plurality of longitudinal folds or pleats f, whereby the fabric body is disposed to produce an initial formation of generally tubular shape, adapted to occupy the mold cavity space between the side walls thereof and the inserted mandrel, whereupon descent of the mandrel is arrested (see Figs. 1 and 2).

The bottom member 13 of the mold block is provided with an axial passage 28 sized to fit and receive the descending mandrel.

The fabric F having been thus deposited in the described prefolded formation within the mold cavity 12 and around the mandrel 14, the compression plunger 16 is thereupon caused to descend along the mandrel and enter the mold cavity 12. As said compression plunger 16 descends the mold cavity, it will slide downwardly over the outswung push finger members 17 and 18, and by such engagement therewith will push back or retract the same, against the tension of their outthrusting spring arms 22—23, into the interior of the mandrel, thus withdrawing the push shoulders 25 and disengaging the same from the fabric F; said push finger members 17 and 18 being thereupon held by the engaging compression plunger 16 in flush relation to the external surfaces of the mandrel to form therewith continuous surface areas conforming to the cylindrical surface of the mandrel, and free from crevices or openings likely to snag wires of the fabric.

As the compression plunger 16 continues to descend the mold cavity 12, it engages the wire mesh fabric formation which surrounds the mandrel 14 so as to exert thereupon an endwise applied collapsing and crushing pressure of selected magnitude. Under the thus applied compressive and crushing force, the longitudinal folds and included contiguous plies of the wire mesh fabric are zigzagged into laterally extending, interentangled, and mutually interlocked additional folds, the wire mesh loops of which are also interengaged and entangled, while at the end of the compression stroke, the initial fabric formation has been crushed down and compressed into a completed self form sustaining, annular or perforate body or unit B (see Fig. 4).

After the annular or perforate body or unit B has been thus produced, the mandrel 14 is upwardly withdrawn, the mold bottom member 13 may then be downwardly and outwardly withdrawn to open the bottom end of the mold cavity, whereupon a further downward movement may be imparted to the compression plunger 16, whereby to eject the finished unit or body B from the mold cavity (see Fig. 5).

It will be obvious that suitable actuating mechanism (not shown) may be provided for producing the described and relatively timed movements of the mandrel, compression plunger and mold bottom member.

It will also be understood that the mandrel and its push finger means may be utilized to introduce into the mold cavity 12 an initial wire mesh fabric formation which comprises winding the fabric material around the raised mandrel at a point below the outswung push finger means, when such method of formation is desired to be utilized as alternative to the mandrel pierced fabric method above described.

Having now described my invention, I claim:

1. Molding apparatus for the purposes described comprising a mold body having an upwardly open mold cavity, a mandrel adapted to be moved axially into and out of said mold cavity, said mandrel having yieldably and laterally projected push finger means spaced above its mold cavity opposing end, and a compression plunger slidable over and along said mandrel into and out of said mold cavity, whereby, when moved toward said mold cavity, said plunger operates to retract said push finger means into flush relation to the external surface of said mandrel.

2. Molding apparatus for the purposes described comprising a mold body having an endwise open mold cavity, removable means to close the bottom end of said cavity, a mandrel adapted to be moved axially into and out of said mold cavity, said mandrel having a pointed free end, said mandrel having yieldably and laterally projected push finger means spaced above its pointed free end, and a compression plunger slidable over and along said mandrel into and out of said mold cavity, whereby, when moved toward said mold cavity, said plunger operates to retract said push finger means into flush relation to the external surface of said mandrel.

3. In molding apparatus for the purposes described, an axially movable mandrel having a laterally open chamber, push finger means adapted to be housed in said chamber, spring means for normally projecting said push finger means from said chamber, and a compression plunger slidable over and along said mandrel, whereby the operative down stroke of said plunger operates to retract said push finger means into said chamber and flush to the external surfaces of said mandrel.

4. In molding apparatus for the purposes described, an axially movable mandrel having a transverse laterally open housing slot, oppositely disposed push finger members adapted to be housed in said slot, said push finger members being pivotally connected by their upper end portions with said mandrel, spring means for outswinging said push fingers for operative projection from said mandrel sides, and a compression plunger slidable over and along said mandrel, whereby the operative down stroke of said plunger operates to retract said push finger members into said housing slot and flush to the external surfaces of said mandrel.

5. Molding apparatus for the purposes described, comprising a mold body having an upwardly open mold cavity, a mandrel adapted to be moved axially into and out of said mold cavity, said mandrel having a pointed free end, said mandrel being further provided with a laterally open chamber spaced above its pointed free end, a push finger means adapted to be housed in said chamber, spring means for normally projecting said push finger means from said chamber, and a compression plunger slidable over and along said mandrel into and out of said mold cavity, whereby, when moved toward said mold cavity, said plunger operates to retract said push finger means into said chamber and flush to the external surface of said mandrel.

6. Molding apparatus for the purposes described, comprising a mold body having an upwardly open mold cavity, a mandrel adapted to be moved axially into and out of said mold cavity, said mandrel having a pointed free end, said mandrel being further provided with a transverse laterally open housing slot spaced above its pointed free end, oppositely disposed push finger members adapted to be housed in said slot, said push finger members being pivotally connected by their upper end portions with said mandrel, spring means for outswinging said push finger members for operative projection from the mandrel sides, means to limit the outswinging movement of said push finger members, and a compression plunger slidable over and along said mandrel, whereby the operative down stroke of said plunger operates to retract said push finger members into said housing slot and flush to the external surfaces of said mandrel.

7. Molding apparatus for the purposes described, comprising a mold body having an endwise open mold cavity, removable means to close the bottom end of said cavity, a mandrel adapted to be moved axially into and out of said mold cavity, said mandrel having a pointed free end, said mandrel being further provided with a laterally open chamber spaced above its pointed free end, a push finger means adapted to be housed in said chamber, spring means for normally projecting said push finger means from said chamber, and a compression plunger slidable over and along said mandrel into and out of said mold cavity, whereby, when moved toward said mold cavity, said plunger operates to retract said push finger means into said chamber and flush to the external surface of said mandrel.

8. Molding apparatus for the purposes described, comprising a mold body having an endwise open mold cavity, removable means to close the bottom end of said cavity, a mandrel adapted to be moved axially into and out of said mold cavity, said mandrel having a pointed free end, said mandrel being further provided with a transverse laterally open housing slot spaced above its pointed free end, oppositely disposed push finger members adapted to be housed in said slot, said push finger members being pivotally connected by their upper end portions with said mandrel, spring means for outswinging said push finger members for operative projection from the mandrel sides, means to limit the outswinging movement of said push finger members, and a compression plunger slidable over and along said mandrel, whereby the operative down stroke of said plunger operates to retract said push finger members into said housing slot and flush to the external surfaces of said mandrel.

OTTO H. YORK.